United States Patent
Crossan et al.

(10) Patent No.: US 11,656,972 B1
(45) Date of Patent: May 23, 2023

(54) PAGINATING RESULTS OBTAINED FROM SEPARATE PROGRAMMATIC INTERFACES

(71) Applicant: Amazon Technologies, Inc., Seattle, WA (US)

(72) Inventors: Robert Crossan, Foxrock (IE); Andrea Giuliano, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/213,123

(22) Filed: Mar. 25, 2021

(51) Int. Cl.
*G06F 11/36* (2006.01)
*G06F 9/54* (2006.01)

(52) U.S. Cl.
CPC .......... *G06F 11/3612* (2013.01); *G06F 9/541* (2013.01); *G06F 9/547* (2013.01)

(58) Field of Classification Search
None
See application file for complete search history.

(56) References Cited

U.S. PATENT DOCUMENTS

| | | | |
|---|---|---|---|
| 8,042,041 B1 * | 10/2011 | Fenn | H04L 29/08729 715/251 |
| 8,204,856 B2 | 6/2012 | Meyer et al. | |
| 9,514,199 B1 * | 12/2016 | Deprey | G06F 16/957 |
| 2013/0018869 A1 * | 1/2013 | Hanson | G06F 16/951 707/E17.014 |
| 2013/0018955 A1 * | 1/2013 | Thaxton | G06F 16/958 709/204 |
| 2015/0134485 A1 | 5/2015 | Kim et al. | |
| 2017/0103127 A1 | 4/2017 | Hanson et al. | |
| 2018/0129716 A1 * | 5/2018 | Su | G06F 16/9024 |
| 2021/0334316 A1 * | 10/2021 | George | G06F 16/951 |

* cited by examiner

*Primary Examiner* — Qing Chen
(74) *Attorney, Agent, or Firm* — S. Scott Foster; Kowert, Hood, Munyon, Rankin & Goetzel, P.C.

(57) ABSTRACT

Results of different programmatic interfaces may be paginated. A request that causes aggregation of results separately returned from different programmatic interfaces may be received. Attempts to obtain the results using the different programmatic interfaces to execute the request may be made. A token that describes result states for the different programmatic interfaces may be included in a response to the request.

20 Claims, 10 Drawing Sheets

PAGINATING RESULTS OBTAINED FROM SEPARATE PROGRAMMATIC INTERFACES

BACKGROUND

Cloud-based infrastructure offers many advantages for companies, developers, or other entities. Obtaining information that describes the state of resources hosted in such environments, as well as other distributed scenarios, may involve utilizing multiple different interfaces. Different interfaces may support different ways of obtaining information and return the information according different formats.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various techniques of paginating results obtained from separate programmatic interfaces are described herein. Aggregation of results from many different sources can provide various systems, services, or applications (or users thereof) with valuable information that is not otherwise stored or provided by one system or location. For example, cloud providers or other large networks hosting hundreds, thousands, or millions of resources on behalf of different entities may utilize result aggregation across various common features, such as metadata describing resources with various tags, labels, or other information, in order to analyze relevant or related resource performance that can only be obtained by invoking separate and independently executed interfaces (e.g., for different services). Because results from some sources can be large, pagination techniques which divide result data into smaller portions (e.g., batches of records) may be implemented in order to provide back results in a viewable/understandable format.

Figure 1:
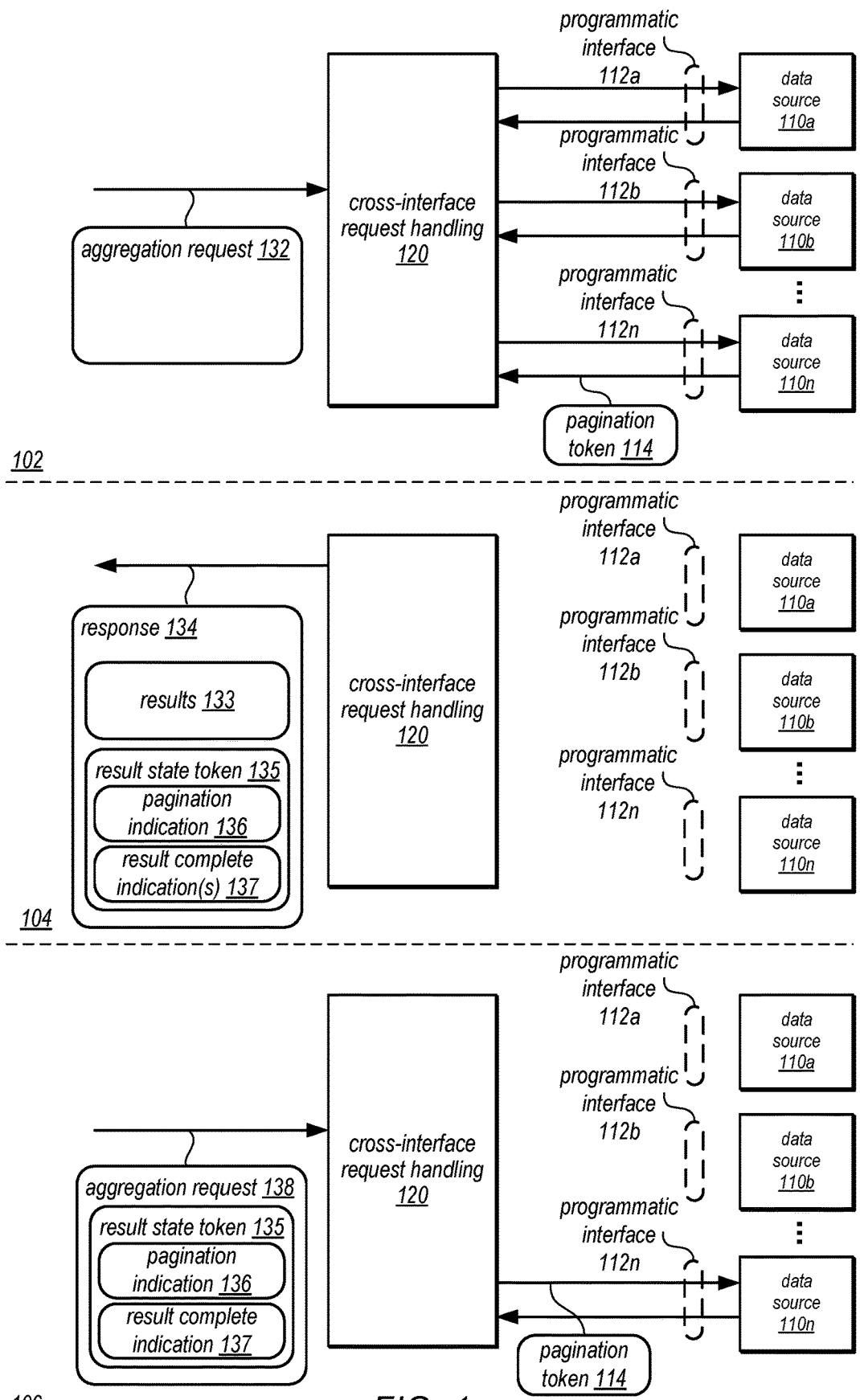
FIG. 1 is a series of block diagrams illustrating paginating results obtained from separate programmatic interfaces, according to some embodiments.

Pagination that is performed in the aggregate may include many common scenarios that could happen while fetching data from multiple sources: a service can go down temporarily, a user/client application may not have permission to access a specific source, the service is going slower than usual and so on. On top of that each source (with different respective programmatic interfaces) may have its own or different pagination schemes, such as different pagination token for each API call. In order to aggregate results while handling the various scenarios that can occur while paginating results, techniques for paginating results obtained from separate programmatic interfaces may be implemented in order to handle different failure scenarios as well as track the state of pagination for different data sources. In this way, pagination for individual sources may be integrated, yet isolated from others (if one fails, data fetched from other integration does not get impacted). Result state tokens may be implemented, in various embodiments, to keep track of various failures happening for a request without blocking the performance of obtaining data for non-failing sources. In this way, systems, services, or applications that support and respond to requests that aggregate results across different programmatic interfaces may be aware of temporary failures and automatically select/deselect specific service integrations, avoid retry storm effects to specific integration failing by using a state machine to exclude such integrations as described in a result state token, and provide a good user experience by fetching all the data (based on the request) on all the possible integrations FIG. 1 is a series of block diagrams illustrating paginating results obtained from separate programmatic interfaces, according to some embodiments. As illustrated in scene 102, a system, application, or service may implement cross-interface request handling 120. For example, a monitoring service 210 as discussed in detail below with regard to FIGS. 2-6, may collect information for a search request across multiple different services. In some embodiments, various federated processing systems (e.g., for databases), event processing, distributed processing, or other scenarios using multiple separate and independently paginated interfaces may implement cross-interface request handling 120 to access and return results from different data sources 110a, 110b, through 110n using different respective programmatic interfaces 112a, 112b, and 112n. A data source 110 may be various types of data store, system, service, or application that implements a programmatic interface 112 (e.g., an Application Programming Interface (API)) to return requested data.

Cross-interface request handling 120 may support aggregation requests 132 submitted via various types of interfaces (e.g., graphical, command line, programmatic) in various formats (e.g., natural language, query language, command/ API format, etc.). Aggregation requests 132 may cause results to be obtained and aggregated using different programmatic interfaces 112, which may be separately accessed and thus may be subject to different failure scenarios/ conditions as well as different pagination schemes (e.g., returning different numbers of results).

As illustrated in scene 102, aggregation request 132 may result in request and responses via the different programmatic interfaces 112*a*, 112*b*, and 112*n* to data sources 110*a*, 110*b*, and 110*n*. One data source, data source 110*n*, may return a pagination token 114, indicating that further data remains to be obtained (e.g., additional records that satisfy requested predicates). As illustrated in scene 104, response 134 may include results 133, both complete and partial results (e.g., paginated results) and a result state token 135. The result state token 135 may indicate which programmatic interfaces need to be used again by indicating a respective result state, such as pagination indication 136 and result complete indication(s) 137 (as discussed in detail below with regard to FIGS. 3-9). In this way, as illustrated in scene 106, remaining data to be obtained can be identified in aggregation request 138 by including result state token 135, which may (by pagination indication 136) identify which programmatic interface (e.g., 112*n*) to access to obtain further data using pagination token 114.

Please note that previous descriptions are not intended to be limiting, but are merely provided as a logical example of scenarios where requests that aggregate data or other results from across different programmatic interfaces may be implemented.

This specification next includes a general description of a provider network, which may implement a monitoring service to provide paginating results obtained from separate programmatic interfaces for resources in services in the provider network. Various examples of a provider network, monitoring service, network-based services and clients are discussed, including different components/modules, or arrangements of components/module that may be employed as part of a monitoring service. A number of different methods and techniques to implement paginating results obtained from separate programmatic interfaces are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
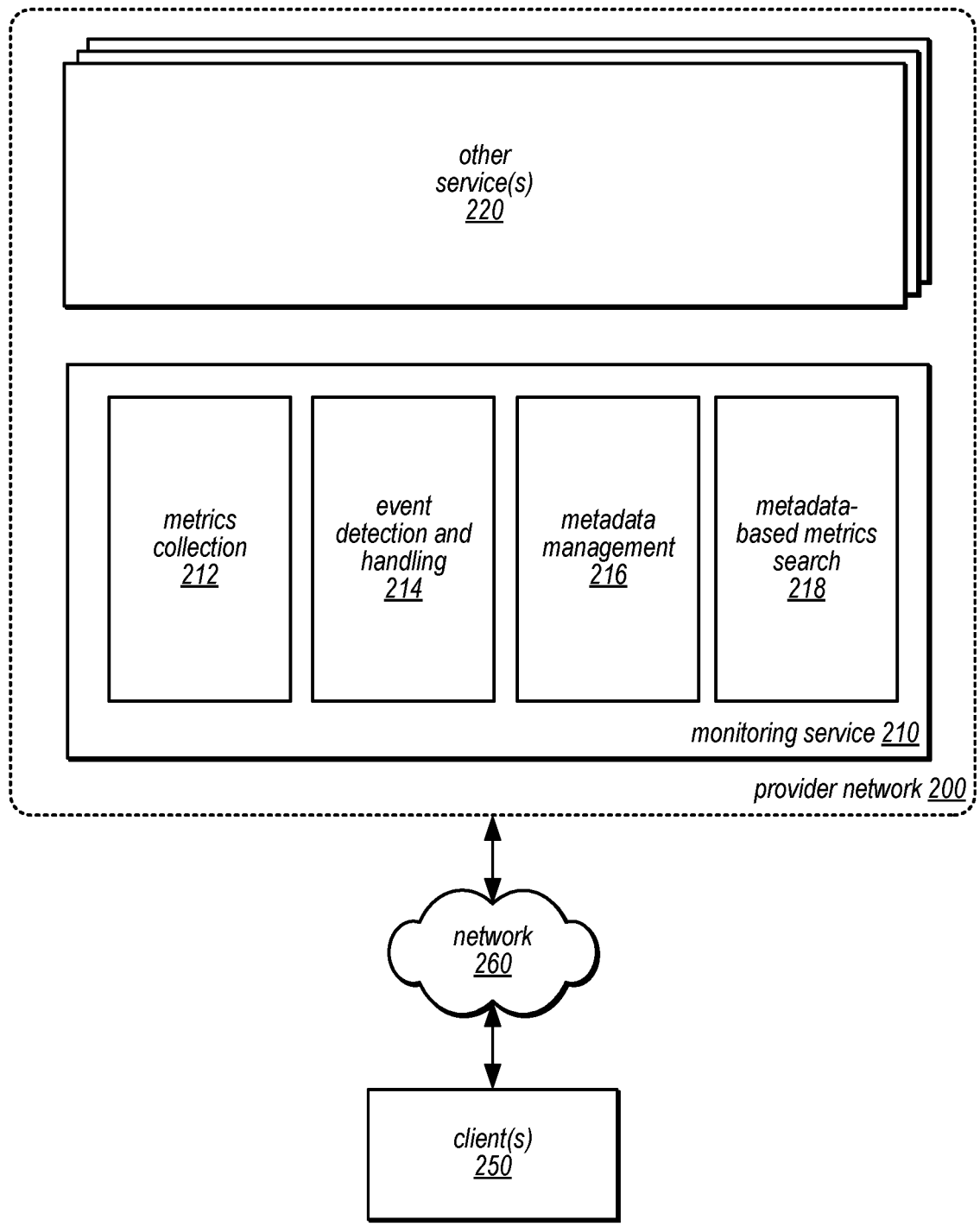
FIG. 2 is block diagram illustrating a provider network that implements multiple different network-based services for clients, including a monitoring service, according to some embodiments.

FIG. 2 is block diagram illustrating a provider network that implements multiple different network-based services for clients, including a monitoring service, according to some embodiments. Provider network 200 may be set up by an entity such as a company or a public sector organization to provide one or more network-based services (such as various types of cloud-based computing or storage) accessible via the Internet and/or other networks to clients 250. Provider network 200 may include numerous data centers hosting various resource pools, such as collections of physical and/or virtualized computer servers, storage devices, networking equipment and the like, needed to implement and distribute the infrastructure and services offered by the provider network 200. In at least some embodiments, provider network 200 may be organized into different regions, data centers, or other collections of devices to implement the services offered by provider network 200. Clients 250 may be configured to access via network 260 network-based services implemented as part of provider network 200 to perform various tasks, implement various systems, functions, or applications.

Provider network 200 may implement many different kinds of services, and thus the following discussion of various services is not intended to be limiting. For example, various network-based services 220 may be implemented such as deployment service(s), management service(s), application service(s), and analytic service(s). In some embodiments, provider network 200 may implement storage service(s). Storage service(s) may be one or more different types of services that provide different types of storage. For example, storage service(s) may be an object or key-value data store that provides highly durable storage for large amounts of data organized as data objects. In some embodiments, storage service(s) may include an archive long-term storage solution that is highly-durable, yet not easily accessible, in order to provide low-cost storage. In some embodiments, storage service(s) may provide virtual block storage for other computing devices, such as compute instances implemented as part of a virtual computing service. For example, a virtual block-based storage service may provide block level storage for storing one or more data volumes mapped to particular clients, providing virtual block-based storage (e.g., hard disk storage or other persistent storage) as a contiguous set of logical blocks. Storage service(s) may replicate stored data across multiple different locations, fault tolerant or availability zones, or nodes in order to provide redundancy for durability and availability for access.

In some embodiments, provider network 200 may implement database service(s). Database services may include many different types of databases and/or database schemes. Relational and non-relational databases may be implemented to store data, as well as row-oriented or column-oriented databases. For example, a database service that stores data according to a data model in which each table maintained on behalf of a client contains one or more items, and each item includes a collection of attributes, such as a key value data store. In such a database, the attributes of an item may be a collection of name-value pairs, in any order, and each attribute in an item may have a name, a type, and a value. Some attributes may be single valued, such that the attribute name is mapped to a single value, while others may be multi-value, such that the attribute name is mapped to two or more values.

Provider network 200 may implement networking service(s) in some embodiments. Networking service(s) may configure or provide virtual networks, such as virtual private networks (VPNs), among resources implemented in provider network 200 as well as control access with external systems or devices. For example, networking service(s) may be configured to implement security groups for compute instances in a virtual network. Security groups may enforce one or more network traffic policies for network traffic at members of the security group. Membership in a security group may not be related to physical location or implementation of a compute instance. The number of members or associations with a particular security group may vary and may be configured.

Networking service(s) may manage or configure the internal network for provider network 200 (and thus may be configured for implementing various resources for a client 250). For example, an internal network may utilize IP tunneling technology to provide a mapping and encapsulating system for creating an overlay network on network and may provide a separate namespace for the overlay layer and the internal network layer. Thus, in this example, the IP tunneling technology provides a virtual network topology; the interfaces that are presented to clients 250 may be attached to the overlay network so that when a client 250 provides an IP address that they want to send packets to, the IP address is run in virtual space by communicating with a mapping service (or other component or service not illustrated) that knows where the IP overlay addresses are.

In some embodiments, provider network 200 may implement virtual computing service(s), to provide computing resources. These computing resources may in some embodiments be offered to clients in units called "instances," "containers" or other virtualization schemes, such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor) or machine image. A number of different types of computing devices may be used singly or in combination to implement compute instances, in different embodiments, including general purpose or special purpose computer servers, storage devices, network devices and the like. In some embodiments clients 250 or other any other user may be configured (and/or authorized) to direct network traffic to a compute instance.

Compute instances may operate or implement a variety of different platforms, such as application server instances, general purpose or special-purpose operating systems, platforms that support various interpreted or compiled programming languages such as Ruby, Perl, Python, C, C++ and the like, or high-performance computing platforms) suitable for performing client 250 applications, without for example requiring the client 250 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

In various embodiments, provider network 200 may implement components to coordinate the metering and accounting of client usage of network-based services, including network-based services, such as by tracking the identities of requesting clients, the number and/or frequency of client requests, the size of data stored or retrieved on behalf of clients, overall storage bandwidth used by clients, class of storage requested by clients, or any other measurable client usage parameter. Provider network 200 may also implement financial accounting and billing service(s), or may maintain a database of usage data that may be queried and processed by external systems for reporting and billing of client usage activity. In certain embodiments, provider network 200 may implement components (e.g., metering service(s)) that may be configured to collect, monitor and/or aggregate a variety of service operational metrics, such as metrics reflecting the rates and types of requests received from clients, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients to enable such clients to monitor their usage of network-based services.

In some embodiments, provider network 200 may implement components to implement user authentication and access control procedures, such as access management service(s), for provider network 200 resources. For example, for a given network-based services request to access a particular compute instance, provider network 200 may implement components configured to ascertain whether the client associated with the access is authorized to configured or perform the requested task. Authorization may be determined such by, for example, evaluating an identity, password or other credential against credentials associated with the resources, or evaluating the requested access to the provider network 200 resource against an access control list for the particular resource. For example, if a client does not have sufficient credentials to access the resource, the request may be rejected, for example by returning a response to the requesting client indicating an error condition.

In various embodiments, provider network 200 may implement a monitoring service 210. Monitoring service 210 may offer various features for gaining visibility into the operation of resources hosted or utilized by other service(s) 220 (e.g., for a user account of provider network). Monitoring service 210 may implement various features, including metrics collection 212 which may track and provide access to various performance metrics of individual resources or groups of resources in other service(s) 220, event detection and handling 214 which may monitor for events and provide alarms, notifications, and/or automated actions (e.g., resource modification) based on various event criteria compared with collected metrics, and metadata management 216, which may allow for various tags, labels, or other information to describe resources, which may then be used by monitoring service 210 (as well as other services 220) to perform various operations with respect to resources identified by their added metadata. As discussed in detail below with regard to FIG. 3, monitoring service 210 may implement metadata-based metrics search 218 to perform search requests across different services, which may include performing pagination across different interfaces.

Network-based services implemented as part of provider network 200 may each implement respective programmatic interfaces, in some embodiments. For example, requests directed to a virtual computing service may be formatted according to an API for the virtual computing service, while requests to storage service(s) may be formatted according to an API for the storage service(s). Different portions of the various APIs may be exposed to external clients, in some embodiments, with some other portions remaining available to internal clients, such as other network-based services in provider network 200.

Clients 250 may encompass any type of client configurable to submit requests to network-based services platform 200, in various embodiments. For example, a given client 250 may include a suitable version of a web browser, or may include a plug-in module or other type of code module configured to execute as an extension to or within an execution environment provided by a web browser. In some embodiments, clients 250 may include sufficient support to send the requests according to various programmatic interfaces for the service, as well as other supported protocols at the resources (e.g., Hypertext Transfer Protocol (HTTP)) for generating and processing network-based service requests without necessarily implementing full browser support. In some embodiments, clients 250 may be configured to generate network-based services requests according to a Representational State Transfer (REST)-style network-based services architecture, a document- or message-based network-based services architecture, or another suitable network-based services architecture. In some embodiments, a client 250 (e.g., a computational client) may be configured to provide access to network-based resource in a manner that is transparent to applications implemented on the client 250 utilizing the provider network resource.

Clients 250 may convey network-based services requests to provider network 200 via network 260, such as search requests to metadata-based metrics search 218 in monitoring service 210. In various embodiments, network 260 may encompass any suitable combination of networking hardware and protocols necessary to establish network-based communications between clients 250 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network. It is noted that in some embodiments, clients 250 may communicate with network-based service using a private network rather than the public Internet.

Figure 3:
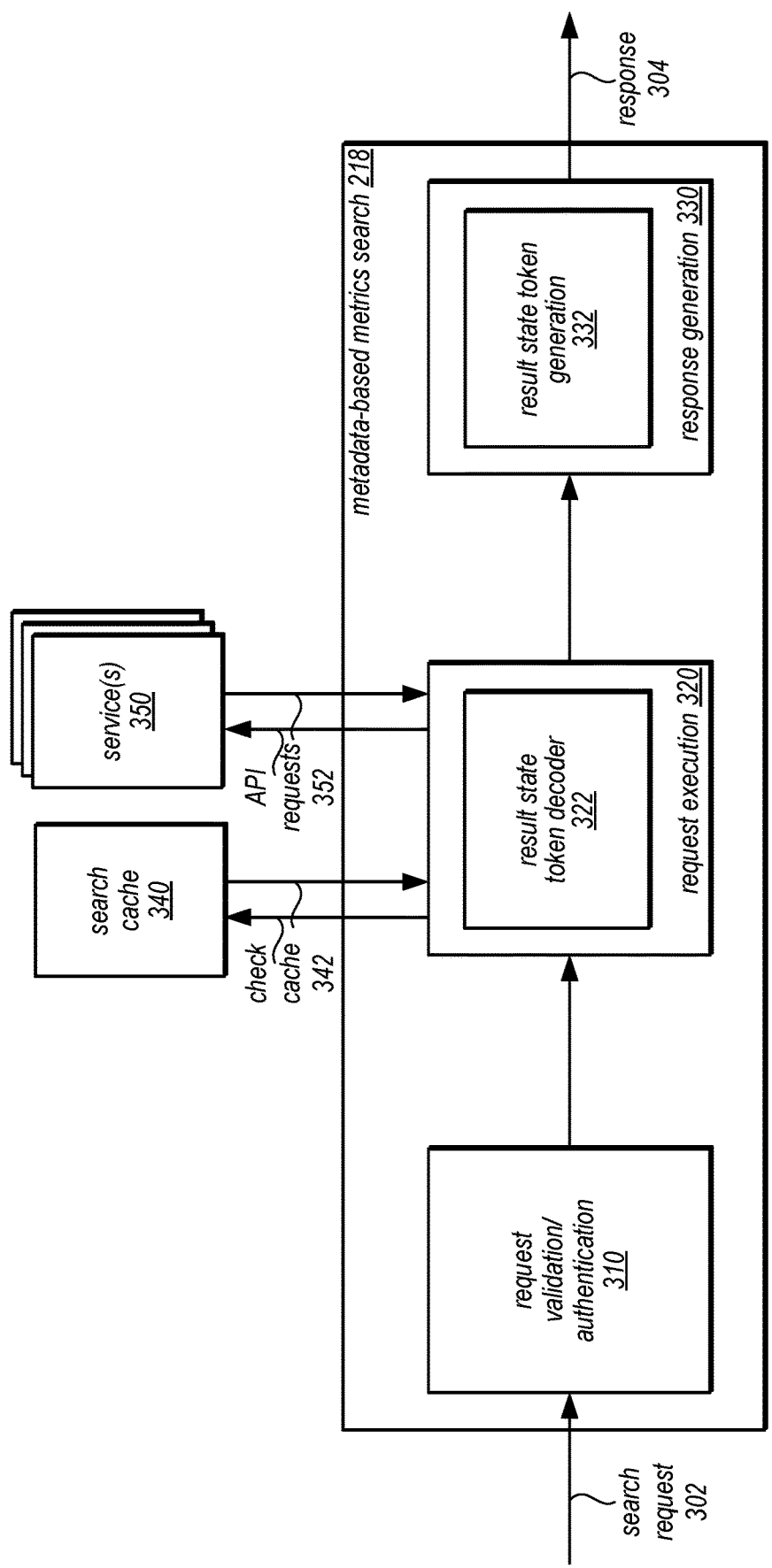
FIG. 3 is a block diagram illustrating metadata-based metrics search for a monitoring service that may perform paginating results obtained from separate programmatic interfaces, according to some embodiments.

FIG. 3 is a block diagram illustrating metadata-based metrics search for a monitoring service that may perform paginating results obtained from separate programmatic interfaces, according to some embodiments. Metadata-based metrics search 218 may support various search requests 302, which may search and obtain data from across multiple different services (or locations within services), in some embodiments. For example, search request 302 may be submitted via an interface (e.g., for monitoring service 210, such as a graphical user interface (GUI), command line, and/or programmatic interface (API) to search various service resources through tags, labels, or other metadata and properties of the resources hosted in the services 220. For example, search requests 302 may allow users to find (and filter) resources using tags, but also to use resource properties (e.g., resource types) as tags, which can then be used to obtain or link to corresponding performance metrics. If, for instance, each computing resource has a "production" tag, label, or other metadata, a search request can be used to aggregate metrics from the computing resources with this "production" tag.

Metadata-based metrics search 218 may implement request validation/authentication 310 to verify the request is authorized and/or valid. For example, identity information which may limit the view of certain performance metrics for certain resources in certain services may be obtained in order to identify whether a request can proceed (or proceed in limited fashion). Validation may ensure that features of the request are correctly specified (e.g., by syntax, existing resources, etc.).

Metadata-based metrics search 218 may implement request execution 320, which may be able to invoke the appropriate APIs or other interface components in order to obtain requested information. In at least some embodiments, a search cache 340 may be implemented which may store the results of prior search requests to use instead of sending API requests 352 to service(s) 350 (which may be various services 220 in FIG. 2). For example, a check 342 of search cache 340 may be performed to identify whether a search request 302 has been previously performed (or a portion of the search request 302) and return a valid result from search cache 340.

In various embodiments, metadata-based metrics search 218 may implement result state token decoder 322 as part of request execution 320. Result state token decoder 322 may implement various techniques as discussed below with regard to FIGS. 4-8, to determine from a result state token if included in search request 302, which services 350 to request 352 and how to request data from the services 350. For example, pagination information, as discussed below with regard to FIGS. 4 and 8 may be used to obtain a next portion of results from a service 350. Each service may implement different respective pagination schemes, in some embodiments. Token decoder 322 may also identify how to handle failed requests as well as completed requests, as discussed below.

Metadata-based metrics search 218 may implement response generation 330 to provide a response 304, in various embodiments. For example, the response may include results, as well as requested formats, manipulations, or other aspects of the results in a response 304. In scenarios where a result state token is warranted (e.g., when further results are to be obtained as a result of pagination or failure), result state token generation 332 may generate and include a result state token, in some embodiments. For example, the various techniques discussed below with regard to FIGS. 4-5, 7, and 9 may be implemented to determine what result to include for different interfaces of different services 350.

Figure 4:
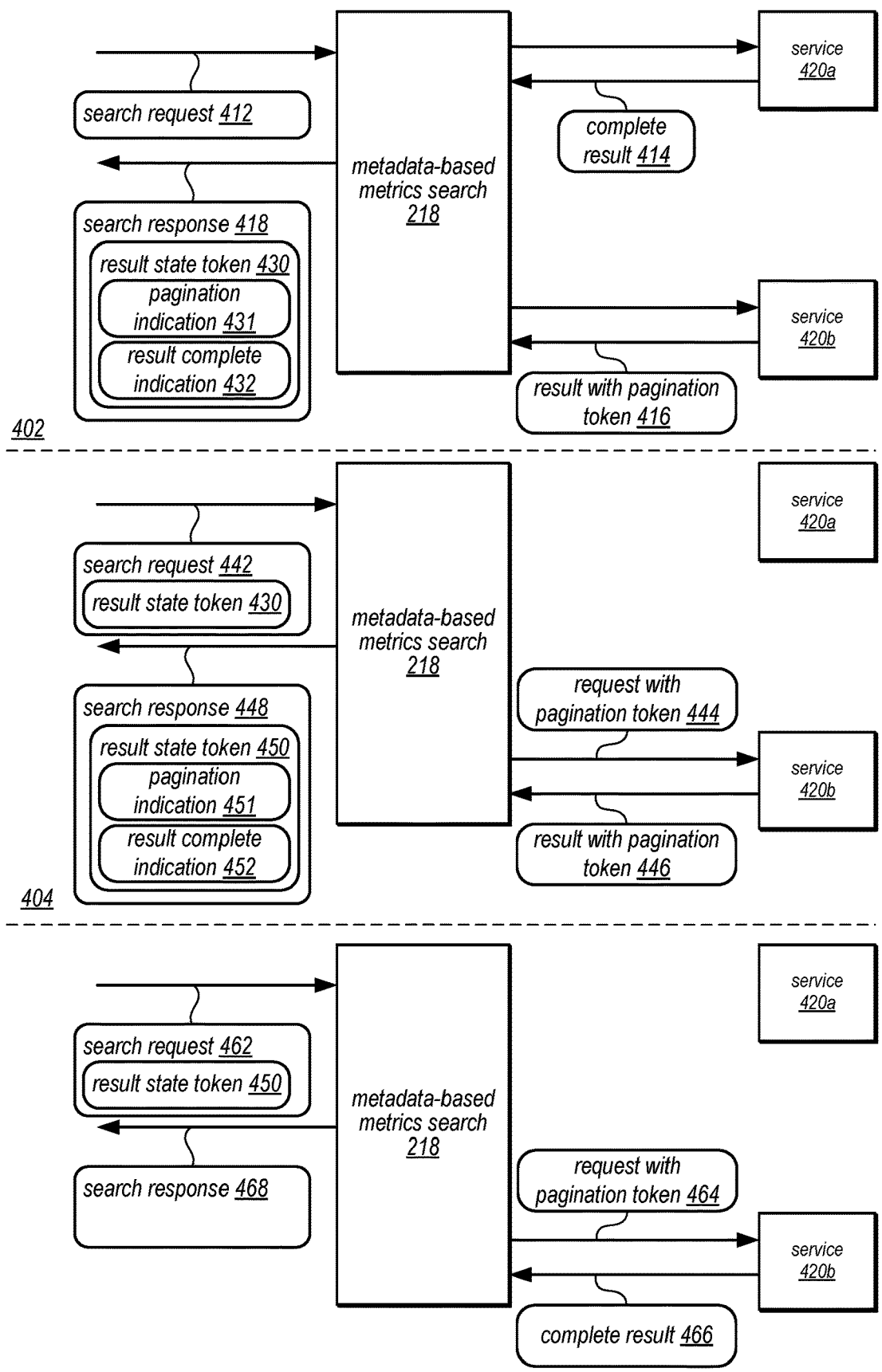
FIG. 4 is a logical block diagram illustrating interactions for search requests across multiple services that utilize a pagination token, in some embodiments.

Pagination may be used for one or multiple different services. As each service may implement its own pagination formatting, requirements, or other features (e.g., how many results can be returned at a time), result state tokens may be used to account for and support pagination in order to conform to each programmatic interface used. FIG. 4 is a logical block diagram illustrating interactions for search requests across multiple services that utilize a pagination token, in some embodiments.

As illustrated in scene 402, a search request 412 may be received by metadata-based metrics search 218. Satisfying search request 412 may include obtaining data from services 420a and 420b (e.g., different ones of services 220 in FIG. 2). Metadata-based metrics search 218 may send requests to each service 420a and 420b according to their respective programmatic interfaces. Service 420a may provide a complete result 414 to metadata-based metrics search 218, but service 420b may provide a paginated result, as indicated by result with pagination token 416. Metadata-based metrics search 218 may include complete result 414 and partial result from service 420b in search response 418 as well as a result state token 430, which may indicate the completion of result 414 for service 420a, as indicated at 432, and a pagination indication 431 for service 420b (e.g., by including a copy of or information from pagination token 416).

As illustrated in scene 404, another search request 442 may be submitted to metadata-based metrics search 218 that includes result state token 430. Metadata-based metrics search 218 may determine, from the result completion indication 432, that service 420a need not be accessed. Metadata-based metrics search 218 may then use the pagination indication 431 in order to request further data from service 420b with a pagination token 444 for service 420b. Again, service 420b may provide a paginated result, as indicated by result with pagination token 446. Metadata-based metrics search 218 may include the partial result from service 420b in search response 448 as well as a result state token 450, which may indicate the completion of result 414 for service 420a, as indicated at 452, and a pagination indication 451 for service 420b (e.g., by including a copy of or information from pagination token 446).

Similar interactions may be performed in scene 406. Another search request 462 may be submitted to metadata-based metrics search 218 that includes result state token 450. Metadata-based metrics search 218 may determine, from the result completion indication 452, that service 420a need not be accessed. Metadata-based metrics search 218 may then use the pagination indication 451 in order to request further data from service 420b with a pagination token 464 for service 420b. Service 420b may provide a complete result 466. Metadata-based metrics search 218 may include the complete result 466 from service 420b in search response 468 without a token (indicating that no further information remains to be obtained for the search request.

Figure 5:
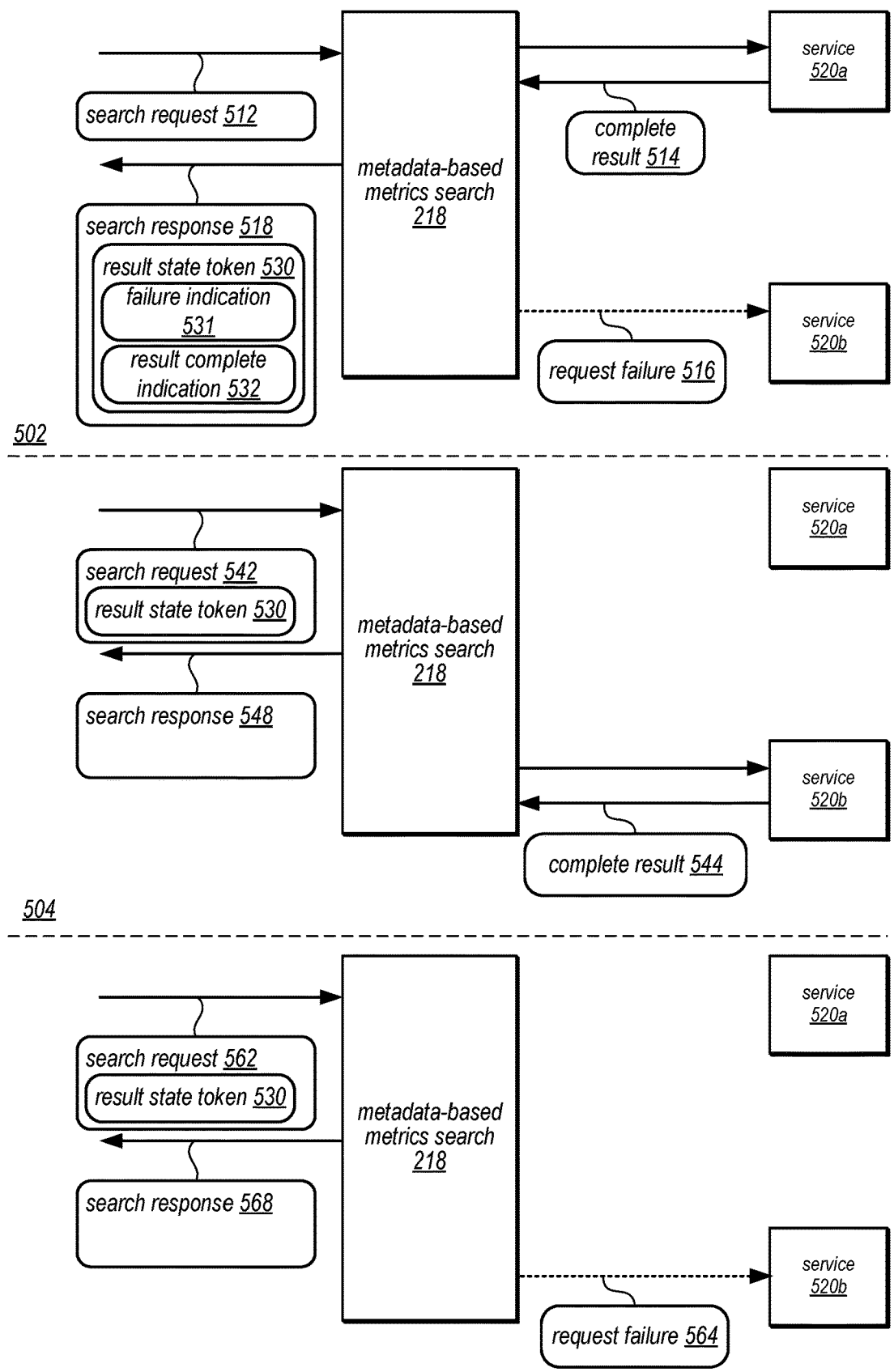
FIG. 5 is a logical block diagram illustrating interactions for search requests across multiple services that encounter failure scenarios, in some embodiments.

Failures can occur for many different reasons when perform a search request. For example, network interrupts, dropped packets, traffic control, or various other scenarios may prevent a service from providing data for inclusion in a search request. FIG. 5 is a logical block diagram illustrating interactions for search requests across multiple services that encounter failure scenarios, in some embodiments.

As illustrated in scene 502, a search request 512 may be received at metadata-based metrics search 218, which may obtain data from service 520a and 520b (e.g., different services 220 in FIG. 2). While a request to obtain the data from service 520a may provide a complete result 514, a request to service 520b may fail, as indicated at 516. For example, the request may timeout (e.g., not receive a response within a period of time), receive an error message/response, and/or receive an indication that the request could not be completed (e.g., due to other conditions not met for the request to complete). Metadata-based metrics search 218 may send search response 518 the complete result 514 and result state token 530. Result state token 530 may indicate that a result completed, as indicated at 532 for service 520a, and a request to a service failed, as indicated at 531 for service 520b.

As illustrated in scene 504, the result state token 530 may be used in search request 542 to obtain the remaining data (e.g., from search request 512). Metadata-based metrics search 218 can determine that service 520a need not be accessed again (according to the result completion indication 532 in result state token 530). Metadata-based metrics search 218 may also determine that service 520b needs to be retired according to the failure indication 531 in result state token 530. In this example, a complete result 544 may now be obtained from service 520b, and a search response 548 with the complete result 544 sent. As no further data is needed for the search request, no token may be included in search response 548.

Scene 506 illustrates an alternative scenario, where a failure occurs again, but does not cause further retries of service 520b. For example, the result state token 530 may be used in search request 562 to obtain the remaining data (e.g., from search request 512). Metadata-based metrics search 218 can determine that service 520a need not be accessed again (according to the result completion indication 532 in result state token 530). Metadata-based metrics search 218 may also determine that service 520b needs to be retired according to the failure indication 531 in result state token 530. The request fails again, as indicated at 564 (e.g., service 520b is unavailable). Instead of sending a token, which might cause a retry, metadata-based metrics search 218 may send a response 568 with no further token.

In some failure scenarios, no initial result state token, such as result state token 530 may returned. For example, if both initial requests to service 520a and 520b were to fail (instead of the request to service 520a succeeding), then search response 518 may indicate a failure instead of providing a result state token 530. In some scenarios, a retry or other second attempt to complete such a search request may be performed first (and also not succeed) before returning the response indicating a failure.

Figure 6:
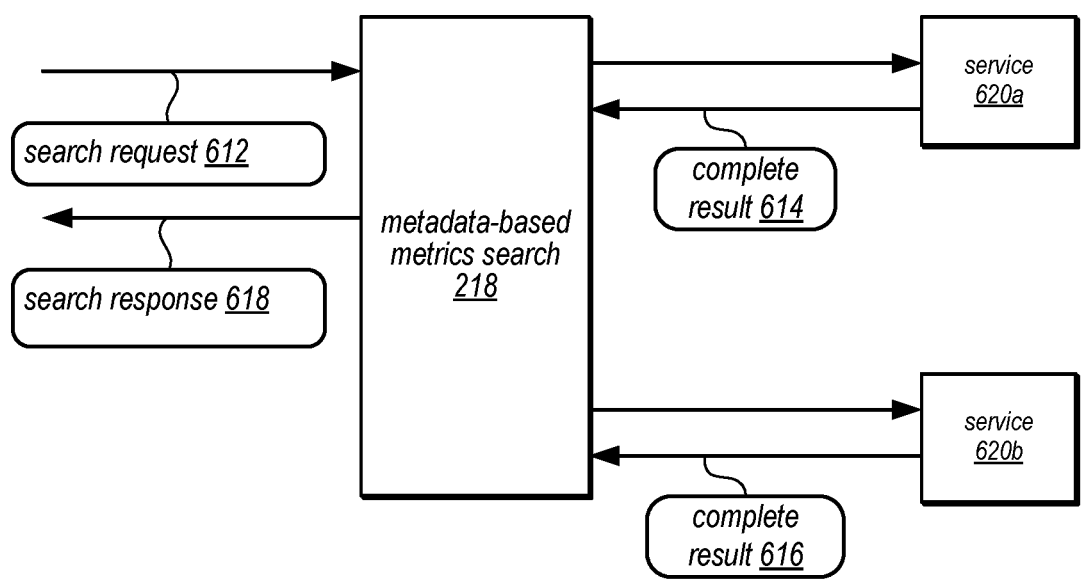
FIG. 6 is a logical block diagram illustrating interactions for search requests across multiple services that do not utilize a result state token, in some embodiments.

In some scenarios, a result state token may not be utilized for interactions between a client application and metadata-based metrics search 218. For example, some requests may be tried only once with respect to a service and, if not successful, may not be retried. FIG. 6 is a logical block diagram illustrating interactions for search requests across multiple services that do not utilize a result state token, in some embodiments.

A search request 612 may be received at metadata-based metrics search 218. The request may identify data to obtain from service 620a and service 620b (e.g., various ones of services 220 in FIG. 2). Metadata-based metrics search 218 may send requests and receive respective complete results 614 and 616 from service 620a and 620b. As no further interaction with metadata-based metrics search 218 may be needed in order to provide a complete result for search request 612, metadata-based metrics search 218 may provide a search response 618 with no token.

Figure 7:
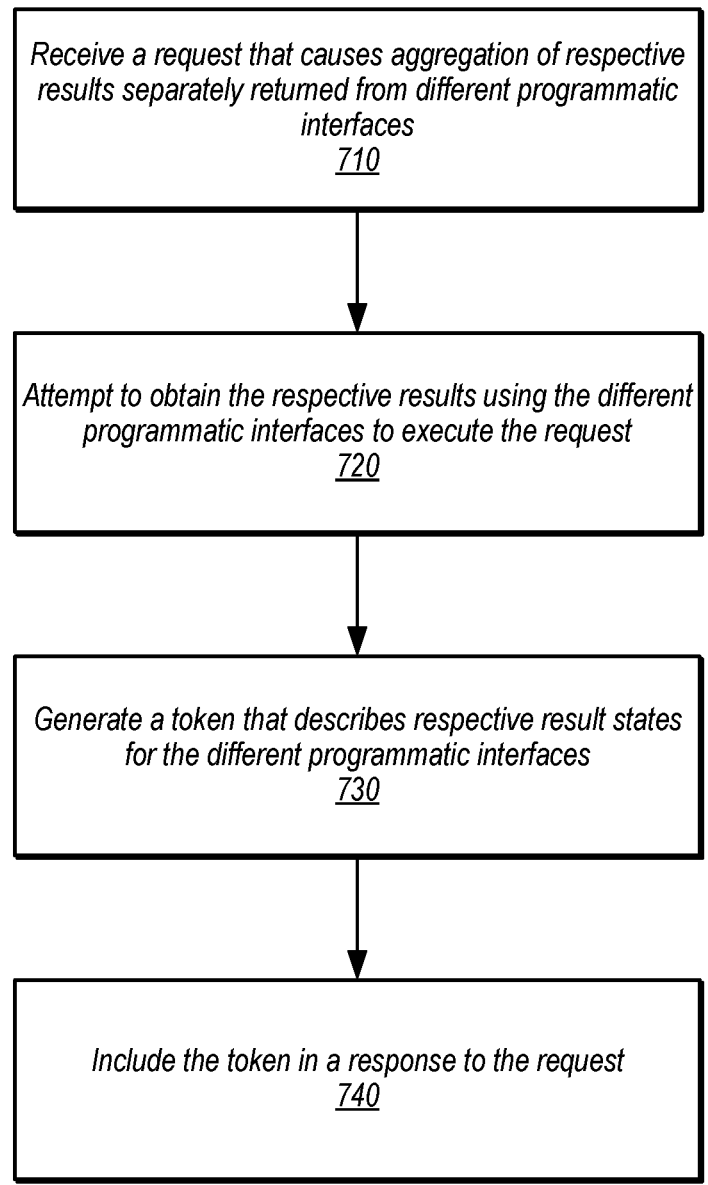
FIG. 7 is a high-level flowchart illustrating various methods and techniques for paginating results obtained from separate programmatic interfaces, according to some embodiments.

Although FIGS. 2-6 have been described and illustrated in the context of a monitoring service, the various components illustrated and described in FIGS. 2-6 may be easily applied to other applications, systems, or services that may paginate results obtained from separate programmatic interfaces. As such, FIGS. 2-6 are not intended to be limiting as to other embodiments. FIG. 7 is a high-level flowchart illustrating various methods and techniques for paginating results obtained from separate programmatic interfaces, according to some embodiments. Various different systems and devices may implement the various methods and techniques described below, either singly or working together. For example, a monitoring service, such as described above with regard to FIGS. 2-6 may implement the various methods. Alternatively, a combination of different systems and devices may implement the described techniques. Therefore, the above examples and or any other systems or devices referenced as performing the illustrated methods, are not intended to be limiting as to other different components, modules, systems, or configurations of systems and devices.

As indicated at 710, a request may be received that causes aggregation of respective results separately returned from different programmatic interfaces, in some embodiments. For example, as discussed above with regard to FIGS. 2-6, search requests that search metadata and/or performance metrics obtained from multiple different provider network services may be aggregated together. In other example scenarios, various databases queries, list retrievals, other data obtained from different sources via different programmatic interfaces (e.g., reading entries or records from a block-based storage device over a network) may be performed as part of a request that aggregates results. Programmatic interfaces may, in various embodiments, include interfaces, such as Application Programming Interfaces (APIs), commands, instructions, libraries, software development kits (SDKs), and/or other communications (e.g., performed using various protocols, connections, or other techniques).

As indicated at 720, attempts to obtain the respective results may be made using the different programmatic interfaces to execute the request, in some embodiments. For example, different respective API calls may be sent to different network endpoints for different systems, services, or other locations that accept such requests. These interfaces may, in some embodiments, utilize various credentials or other information to indicate authorization, which may be included in the request or obtained in response to receiving the request. Although not illustrated in FIG. 7, in some embodiments, a cache of prior results (as discussed above with regard to FIG. 3) may be utilized in place of the programmatic interfaces. As discussed in detail below with regard to FIG. 8, the request may include a result state token (from a response to a prior request), which may indicate how/if the different programmatic interfaces should be used.

As indicated at 730, a token may be generated that describes the respective results states for the programmatic interfaces, in some embodiments. For example, different states, such as complete, failure, pagination, and/or other states may be identified for each programmatic interface (e.g., according to the techniques discussed below with regard to FIG. 9). The token may be generated according to a format, encoding, structure, or other representation that may associates the individual result states of each programmatic interface. In some embodiments, various human-readable formats for the token (e.g., Javascript Object Notation (JSON)) may be used or in other embodiments, non-human readable encoding schemes may be used.

As indicated at 740, the token may be included in a response to the request, in some embodiments. For example, results (as well as any formatting, manipulation, modification or other techniques specified in the request for a response may be applied to the results) may be provided along with the token, allowing a client application that sent the request to obtain request results and determine, based on the token, whether the request should be performed again (e.g., to obtain additional data and/or handle a failure identified for one or more of the programmatic interfaces). As indicated in the discussion above with regard to FIG. 6, there may be some scenarios where requests that aggregate across multiple programmatic interfaces do not include a token.

Figure 8:
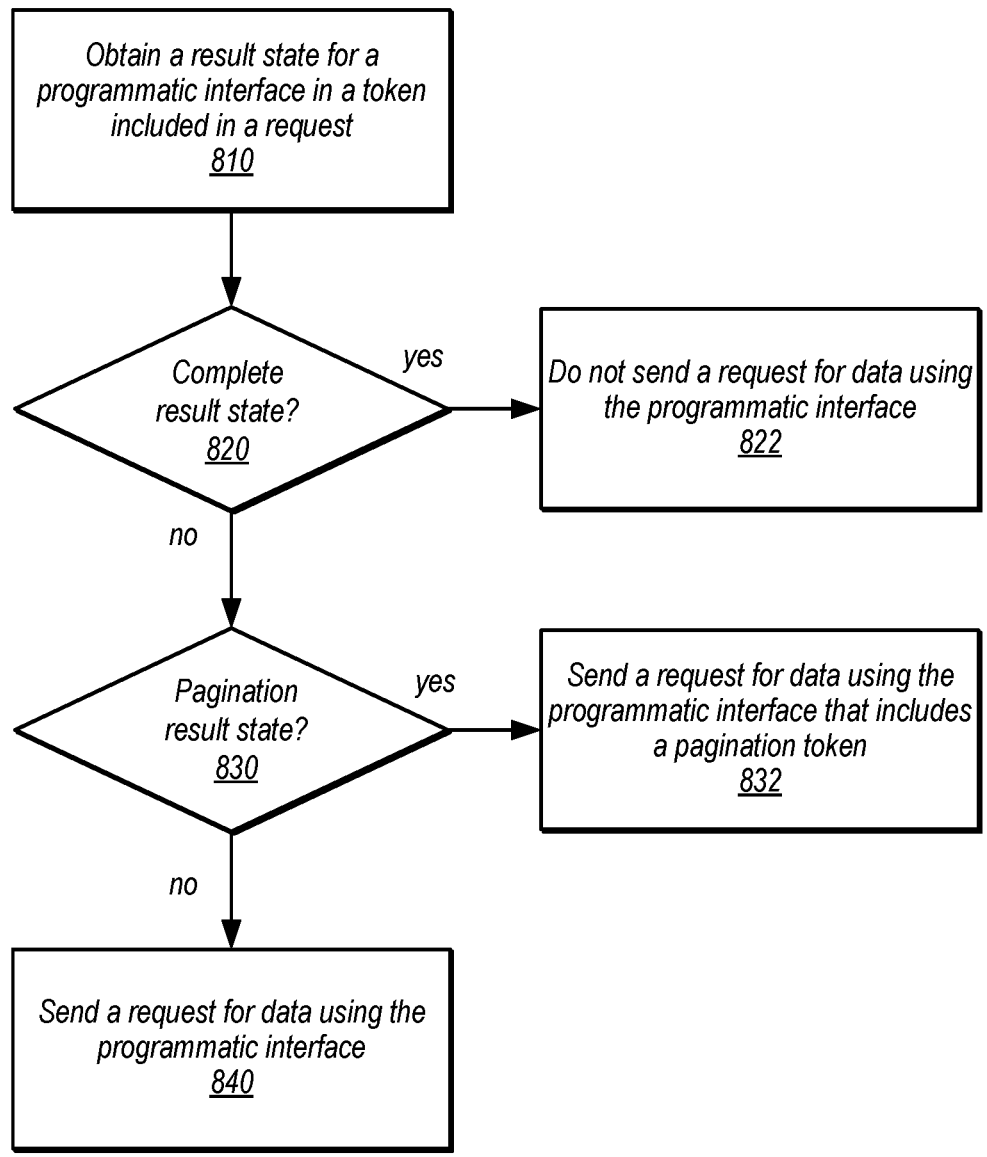
FIG. 8 is a high-level flowchart illustrating various methods and techniques for handling a request with a result state token, according to some embodiments.

As illustrated in the examples discussed above with regard to FIGS. 4 and 5, in some scenarios a result state token may be included with a request that aggregates results from multiple different programmatic interfaces (e.g., in scenarios where a previous first request has already been performed and a response returned that includes the result state token). Handling techniques for decoding, evaluating, and/or otherwise utilizing a result state token to advance performance of the request (e.g., without returning redundant data or handling various failures) may depend on the different result states indicated in the request. FIG. 8 is a high-level flowchart illustrating various methods and techniques for handling a request with a result state token, according to some embodiments. Such techniques may be repeated for each programmatic interface to be used for the request, in some embodiments.

As indicated at 810, a result state for a programmatic interface may be obtained that is included in a token included in a request, in some embodiments. For example, the token may have a state field that corresponds to or is associated with each programmatic interface with one of a possible set of result states specified (e.g., complete, pagination, failure, etc.). As indicated at 820, a determination may be made as to whether the result state is indicated as complete, in some embodiments. If the result state for the programmatic interface is complete, then a request for data using the programmatic interface may not be sent, as indicated at 822. For instance, the complete result state may indicated that the data was obtained and provided in a prior response for the request.

As indicated at 830, a determination may be made as to whether the result state is a pagination state, in some embodiments. As indicated at 832, for pagination indicated result states, a request may be sent for data using the programmatic interface that includes a pagination token, in some embodiments. The pagination token may be generated from the pagination indication (e.g., by extracting data from various fields or parameters in the token and generating the pagination token according to a format that conforms with the programmatic interface). In some embodiments, the pagination indication may be a replica of the pagination token returned via the programmatic interface for a prior request for data and thus may already conform to the programmatic interface.

For result states that are not complete or pagination, then a determination may be made to execute the request for data using the programmatic interface, in some embodiments, as indicated at 840. For example, a failure state may cause a retry of the request for data using the programmatic interface.

Figure 9:
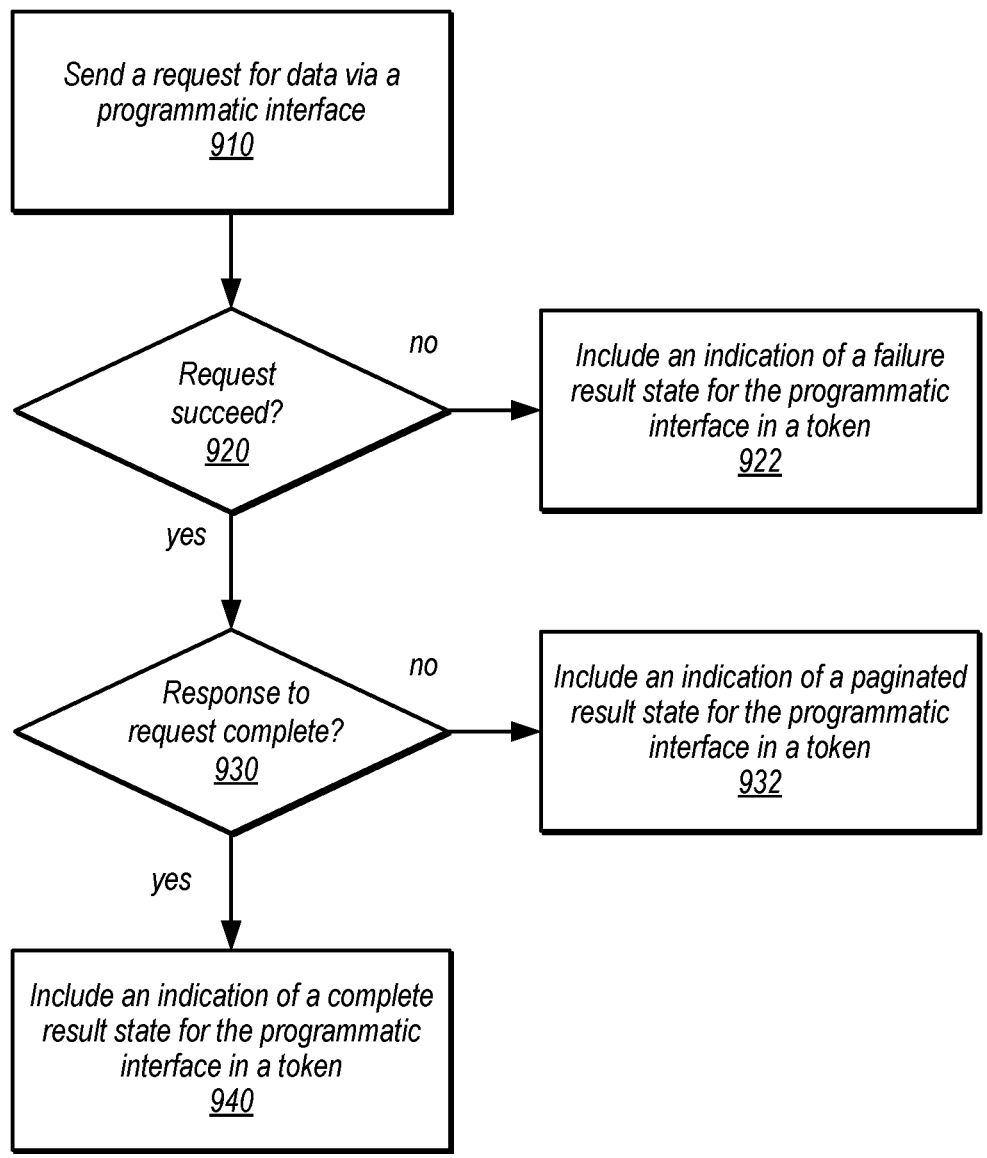
FIG. 9 is a high-level flowchart illustrating various methods and techniques for generating a result state token, according to some embodiments.

As discussed above with regard to FIG. 7, tokens included in responses to requests that aggregate results from multiple different programmatic interfaces may indicate the state of result processing for each programmatic interface. Different techniques for encoding, describing, storing or otherwise generating these result states may be implemented for a token. FIG. 9 is a high-level flowchart illustrating various methods and techniques for generating a result state token, according to some embodiments. Such techniques may be performed for each of the different programmatic interfaces in order to determine and include a respective result state.

As indicated at 910 a request may be sent for data via a programmatic interface, in some embodiments. For example, as noted earlier various API calls may be invoked, protocols, commands, or other communication schemes that request data to be included in a response to a request may be performed. Each request may be independently performed (e.g., to a different network-based service, system, or location). Different types of result states may be determined according to the attempted performance of the request. For example, as indicated at 920, success may be indicated for a request. A response, or other non-error message, may be received back in response to the sent request indicating success. In some embodiments, the response itself may include values, features, or parameters that indicate success or failure (e.g., a read operation conditionally performed upon a statement evaluating to true, such as a read value of an object that has statement "Version==XYZ"). In some embodiments, a lack of response (e.g., after waiting a period of time) may be indicated of a request failure or, as in the example above, some condition, variable, or parameter of a response to the request may indicate that request failed, including various error codes or signals. If the request did not succeed, then as indicated at 922, an indication of a failure result state may be included for the programmatic interface in a token, in some embodiments. In some embodiments, a retry limit or other condition or criteria may be applied that would include a complete state (instead of a failure state) if the request did not succeed. For example, if the request was already retried 3 times and a retry limit is 3, then instead of including a failure state which may cause a fourth retry, a complete state may be included instead. In some embodiments, complete state included as a result of failures may indicate the "cause" of completion is due to failure or unavailability of the requested data. In some embodiments, the criteria for limiting retries may be specified in a request (e.g., by a client that submits the request for aggregating results across the interfaces), which may be indicated in the result state token (or in some other parameter, field, or value of the request).

As indicated at 930, another result state that may be determined is a "complete request" state. For example, a response to the request may only return one data item (or a number of items less than some pagination threshold), indicating that the request is complete. In some embodiments the response may include a token, parameter, or other value indicating that the request is complete. In some embodiments, the lack of a pagination token included in the response may indicate that the request is complete. As indicated at 940, an indication of a complete result state for the programmatic interface may be included in a token.

For requests that are not complete, as indicated by the negative exit from 930, a pagination technique may be implemented in order to obtain the data in multiple parts. For example, as indicated at 932, an indication of a paginated result state for the programmatic interface may be included in a token. This indication may be a copy of (or generated from) a pagination token or other indication provided in response to the request along with a portion of the requested data. The indication of pagination may include information, such as a starting and/or stopping value, in order to provide in a subsequent request to obtain the next data (and not repeat already obtained data), in some embodiments.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of various servers and other components that implement the client and/or provider network described herein). The various methods as illustrated in the figures and described herein represent example embodiments of methods. The order of any method may be changed, and various elements may be added, reordered, combined, omitted, modified, etc.

Figure 10:
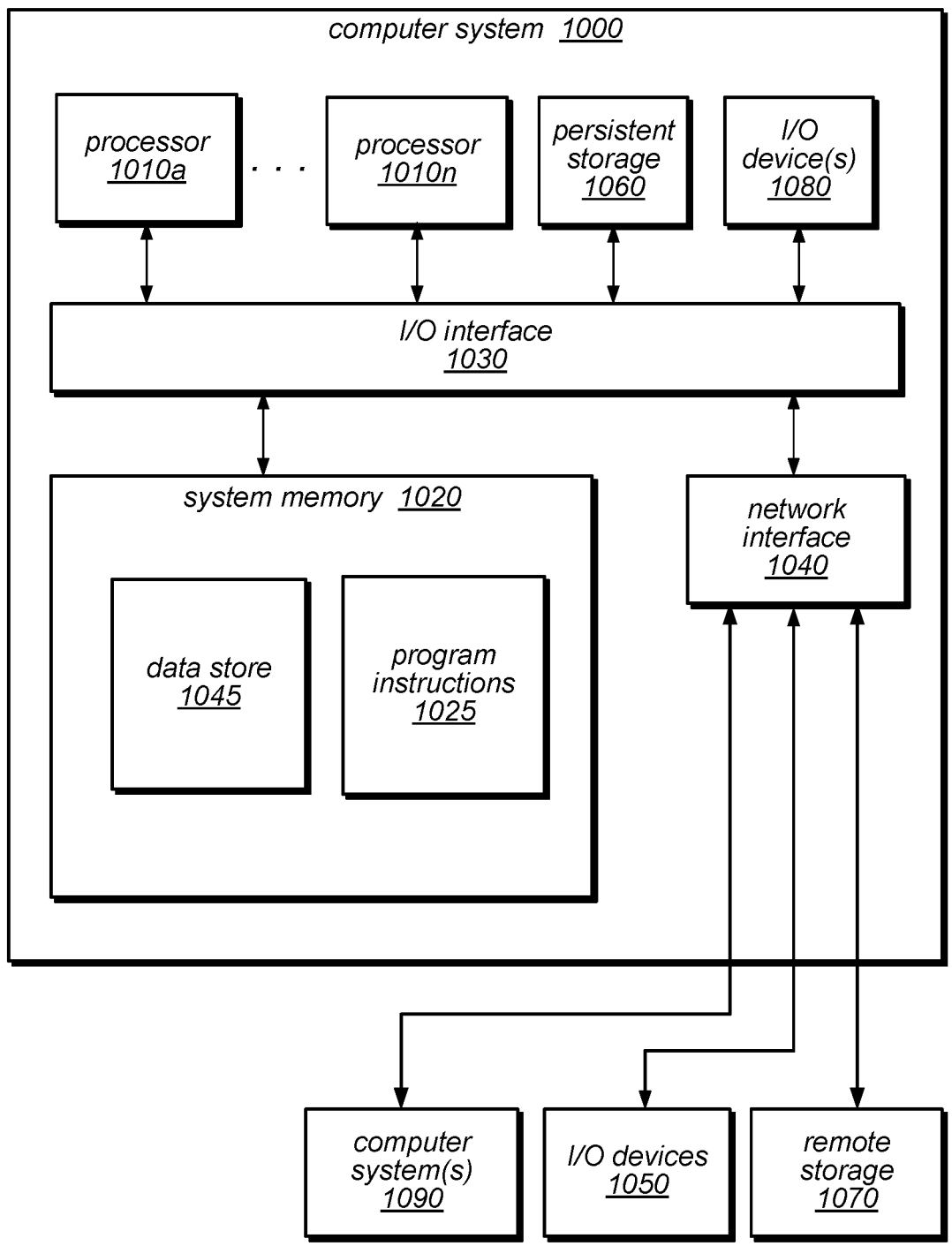
FIG. 10 is a block diagram illustrating an example computing system, according to some embodiments.

Embodiments of automated management of resource attributes across network-based services as described herein may be executed on one or more computer systems, which may interact with various other devices. FIG. 10 is a block diagram illustrating an example computer system, according to various embodiments. For example, computer system 1000 may be configured to implement nodes of a provider network, network-based service, a data store, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the system described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a service platform specific language engine, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   at least one processor; and
   a memory storing program instructions that, when executed by the at least one processor, cause the at least one processor to:
   receive a request that causes aggregation of respective results separately returned from a plurality of different programmatic interfaces;
   obtain the respective results using the plurality of different programmatic interfaces to execute the request;
   generate a first token that describes respective result states for the plurality of different programmatic interfaces, wherein a respective result state for a first programmatic interface of the plurality of different programmatic interfaces indicates that a respective result for the first programmatic interface of the plurality of different programmatic interfaces is paginated with a further portion of the respective result to be obtained from the first programmatic interface of the plurality of different programmatic interfaces, wherein the request includes a second token that was included in a prior response that also included a first portion of the respective result to be obtained from the first programmatic interface of the plurality of different programmatic interfaces, wherein the second token comprises pagination information to obtain a second portion of the respective result using the first programmatic interface of the plurality of different programmatic interfaces, and wherein the second portion of the respective result is returned as part of a response to the request; and
   include the first token in the response to the request.

2. The system of claim 1, wherein a respective result state for a second programmatic interface of the plurality of different programmatic interfaces indicates a failure to obtain the respective result for the second programmatic interface of the plurality of different programmatic interfaces.

3. The system of claim 1, wherein the memory stores further program instructions that, when executed by the at least one processor, cause the at least one processor to determine that a result cache does not include the respective results before using the plurality of different programmatic interfaces.

4. The system of claim 1, wherein the plurality of different programmatic interfaces are implemented for different respective services offered by a provider network, and wherein the request is received at a monitoring service offered by the provider network.

5. A method, comprising:
   receiving a request that causes aggregation of respective results separately returned from a plurality of different programmatic interfaces;
   obtaining the respective results using the plurality of different programmatic interfaces to execute the request;
   generating a first token that describes respective result states for the plurality of different programmatic interfaces, wherein a respective result state for a first programmatic interface of the plurality of different programmatic interfaces indicates that a respective result for the first programmatic interface of the plurality of different programmatic interfaces is paginated with a further portion of the respective result to be obtained from the first programmatic interface of the plurality of different programmatic interfaces, wherein the request includes a second token that was included in a prior response that also included a first portion of the respective result to be obtained from the first programmatic interface of the plurality of different programmatic interfaces, wherein the second token comprises pagination information to obtain a second portion of the respective result using the first programmatic interface of the plurality of different programmatic interfaces, and wherein the second portion of the respective result is returned as part of a response to the request; and
   including the first token in the response to the request.

6. The method of claim 5, wherein the plurality of different programmatic interfaces are implemented for different respective services offered by a provider network, and wherein the request is received at a monitoring service offered by the provider network.

7. The method of claim 5, wherein a respective result state for a second programmatic interface of the plurality of different programmatic interfaces indicates a failure to obtain the respective result for the second programmatic interface of the plurality of different programmatic interfaces.

8. The method of claim 5, wherein a respective result state for a second programmatic interface of the plurality of different programmatic interfaces indicates a completed state after failing to obtain the respective result for the second programmatic interface of the plurality of different programmatic interfaces within a retry limit.

9. The method of claim 5, wherein the second token comprises a respective result state for a second programmatic interface of the plurality of different programmatic interfaces that indicates completion of the respective result for the second programmatic interface of the plurality of different programmatic interfaces, and wherein the second programmatic interface of the plurality of different programmatic interfaces is not used to return the response to the request.

10. The method of claim 5, further comprising:
receiving a further request that causes aggregation of the respective results separately returned from the plurality of different programmatic interfaces, wherein the further request includes the first token;
using pagination information in the first token to obtain the further portion of the respective result from the first programmatic interface of the plurality of different programmatic interfaces; and
returning a further response to the further request that includes the further portion of the respective result from the first programmatic interface of the plurality of different programmatic interfaces.

11. The method of claim 10, wherein the further response to the further request does not include a token.

12. The method of claim 5, further comprising determining that a result cache does not include the respective results before using the plurality of different programmatic interfaces.

13. The method of claim 5, wherein a respective result state for a second programmatic interface of the plurality of different programmatic interfaces indicates that the respective result for the second programmatic interface of the plurality of different programmatic interfaces is paginated with a further portion of the respective result to be obtained from the second programmatic interface of the plurality of different programmatic interfaces, and wherein a different pagination scheme is used for the second programmatic interface of the plurality of different programmatic interfaces than the first programmatic interface of the plurality of different programmatic interfaces.

14. One or more non-transitory computer-readable storage media storing program instructions that, when executed on or across one or more computing devices, cause the one or more computing devices to implement:
receiving a request that causes aggregation of respective results separately returned from a plurality of different programmatic interfaces;
obtaining the respective results using the plurality of different programmatic interfaces to execute the request;
generating a first token that describes respective result states for the plurality of different programmatic interfaces, wherein a respective result state for a first programmatic interface of the plurality of different programmatic interfaces indicates that a respective result for the first programmatic interface of the plurality of different programmatic interfaces is paginated with a further portion of the respective result to be obtained from the first programmatic interface of the plurality of different programmatic interfaces, wherein the request includes a second token that was included in a prior response that also included a first portion of the respective result to be obtained from the first programmatic interface of the plurality of different programmatic interfaces, wherein the second token comprises pagination information to obtain a second portion of the respective result using the first programmatic interface of the plurality of different programmatic interfaces, and wherein the second portion of the respective result is returned as part of a response to the request; and
including the first token in the response to the request.

15. The one or more non-transitory computer-readable storage media of claim 14, storing further program instructions that, when executed on or across the one or more computing devices, cause the one or more computing devices to further implement:
receiving a further request that causes aggregation of the respective results separately returned from the plurality of different programmatic interfaces, wherein the further request includes the first token;
using pagination information in the first token to obtain the further portion of the respective result from the first programmatic interface of the plurality of different programmatic interfaces; and
returning a further response to the further request that includes the further portion of the respective result from the first programmatic interface of the plurality of different programmatic interfaces.

16. The one or more non-transitory computer-readable storage media of claim 14, wherein the second token indicates that an execution of a prior request failed to obtain the respective result for a second programmatic interface of the plurality of different programmatic interfaces.

17. The one or more non-transitory computer-readable storage media of claim 14, storing further program instructions that, when executed on or across the one or more computing devices, cause the one or more computing devices to further implement:
receiving a further request that causes aggregation of respective results separately returned from two or more programmatic interfaces of the plurality of different programmatic interfaces;
attempting to obtain the respective results using the two or more programmatic interfaces of the plurality of different programmatic interfaces to execute the further request; and
returning a further response to the further request indicating a failure to obtain the aggregation of the respective results separately returned from the two or more programmatic interfaces of the plurality of different programmatic interfaces.

18. The one or more non-transitory computer-readable storage media of claim 14, wherein a respective result state for a second programmatic interface of the plurality of different programmatic interfaces indicates a completed state after failing to obtain the respective result for the second programmatic interface of the plurality of different programmatic interfaces a number of times.

19. The one or more non-transitory computer-readable storage media of claim 14, wherein a respective result state for a second programmatic interface of the plurality of different programmatic interfaces indicates a completed state after successfully obtaining the respective result for the second programmatic interface of the plurality of different programmatic interfaces.

20. The one or more non-transitory computer-readable storage media of claim 14, wherein the plurality of different programmatic interfaces are implemented for different respective services offered by a provider network, and wherein the request is received at a monitoring service offered by the provider network.

\* \* \* \* \*